WILLIAM R. HOOK
INVENTOR.

Oct. 26, 1965  W. R. HOOK  3,214,700
VARIABLE THRESHOLD SIGNAL DETECTION SYSTEM
Filed March 17, 1961  3 Sheets-Sheet 2

WILLIAM R. HOOK
INVENTOR.

BY
ATTORNEYS

WILLIAM R. HOOK
INVENTOR.

United States Patent Office 3,214,700
Patented Oct. 26, 1965

3,214,700
VARIABLE THRESHOLD SIGNAL DETECTION SYSTEM
William R. Hook, Los Angeles, Calif., assignor to TRW Inc., a corporation of Ohio
Filed Mar. 17, 1961, Ser. No. 96,586
2 Claims. (Cl. 328—165)

This invention relates to systems for identifying the occurrence of signals having a magnitude greater than a selected threshold value, and more particularly to a new and improved system for establishing threshold levels which operate to distinguish legitimate signals from concomitant noise signals.

In many types of electrical systems, useful electrical signals appear along with interfering signals such as noise which may lead to a false operation of a component which is intended to be responsive only to the useful signals. Where the magnitude of a useful signal is substantially greater than that of the interfering signals appearing along with the useful signal, it is common practice to employ a device which is responsive only to applied signals having a magnitude greater than a predetermined fixed threshold value so that the useful signals may be effectively separated from the spurious interfering signals. On the other hand, where the magnitude of the useful signals is of the same order of magnitude as that of the interfering signals, a fixed threshold device is apt either to provide false output indications in response to the interfering signals or to fail to respond to a legitimate useful signal depending upon the level at which the threshold of operation is established.

The problem of separating useful signals from spurious interfering signals is particularly acute in systems in which the useful signals are detected by signal correlation technuiques. For example, in a system for determining the position of a signal source such as an aircraft radio transmitter, the signals received by two spatially separated receiving stations may be multiplied together, with the product signal being averaged over a selected time interval to produce a significant response to correlated components of the received signals.

The signals received at the two stations contain mutually coherent signal components, but these signal components are displaced in time from a coincident relationship in accordance with the difference in the time required for the signals to travel between the originating source and the two different receiving stations. Since the velocity of propagation of the signals from the source is substantially constant, the timing displacement between the signal components may be equated directly to a path length difference. Knowing the path length difference, one may ascertain a hyperbolic line of position, taken relative to the two receiving stations as focal points, along which the source is located. By establishing the intersection of two such lines of position, the position of the source may be determined.

However, the output signal from the multiplier of a signal correlation system generally includes spurious signal components appearing along with the useful output signal. The normal output of the signal multiplier is a noise signal which fluctuates about a quiescent level and the presence of mutually coherent signal components may result in only relatively minor excursions from this normal output signal. Where a signal responsive device having a preset threshold of operation is connected to the signal multiplier for the purpose of separating useful signals from interfering noise signals, the threshold of operation of the device must be properly established to insure a proper operation of the system. Thus, where the threshold level is set too high, some aircraft may not be located, and where the threshold level is set too low, the system may operate to provide false indications in response to spurious signals.

Accordingly, it is a primary object of the present invention to provide a new and improved variable threshold circuit for distinguishing useful electrical signals from interfering signals.

It is another object of the present invention to provide a signal responsive device having a variable threshold of operation which is automatically set to a value for optimum detection of useful signals accompanied by interfering signals.

It is yet another object of the present invention to provide a signal responsive device in which a variable threshold of response is automatically set in accordance with the characteristics of received interfering signals.

It is a still further object of the invention to provide a method and apparatus for identifying the occurrence of a useful signal accompanied by spurious signals having a magnitude approaching the magnitude of the useful signal.

In accordance with the present invention, useful electrical signals are distinguished from spurious signals, which may be characterized as noise, by establishing a threshold of operation of a signal responsive device in accordance with known characteristics of the spurious signals accompanying a useful signal. For optimum results, the threshold of the signal responsive device should be set at a level which passes the useful electrical signals while rejecting the spurious signals, or noise, so as to provide maximum permissible sensitivity for the device. As the characteristics of the respective useful signals and noise vary, however, the threshold level of the signal responsive device may be varied in order to maintain the desired maximum sensitivity thereof. At an optimum threshold setting for a given noise signal, false indications resulting from noise exhibiting a particular characteristic are encountered at a very low rate. An acceptable rate of false indications from the signal responsive device is so small as to render it impractical to depend upon the false indication rate for setting the threshold level of the signal responsive device. The present invention, therefore, provides for the setting of this threshold level in accordance with the measurement of a predetermined high false indication rate which bears a predetermined relationship to the acceptable rate.

As various threshold response levels, the false indication rate may be determined as a function of the characteristics of the noise signals. In accordance with the invention, in one arrangement thereof, a pair of threshold circuits are provided in conjunction with separate signal responsive devices connected to the received signal channel. The second threshold circuit is arranged to have a setting which provides a relatively high rate of false indications from its associated signal responsive device. The threshold settings of the two circuits are different but bear a proportionality which is determined from the characteristics of the received noise signals. The output of the second signal responsive device which is deliberately arranged to provide a high false indication rate is employed in accordance with an aspect of the invention to automatically set the threshold of the first threshold circuit at level related to the false indication rate of the second device and, through the proportional relationship between the two circuits, to establish the threshold of the first circuit at a level which provides the acceptable false indication rate for the signal responsive system. In this manner, the invention permits the signal responsive system to be maintained at its level of maximum sensitivity over a wide range of conditions of the received signal.

In accordance with an aspect of the invention, the false indication rate of the threshold setting portion of the system is established at a sufficiently high level so that the presence of useful signals has a negligible effect upon the establishment of the threshold level. Thus, by establishing a threshold level for a device which is responsive to useful signals and relating this threshold level to the adjustment of a similar device for a selected false indication rate, the observance of a useful signal may be determined with a high degree of probability, while at the same time the number of false indications from the useful signal responsive device is kept at a minimum.

In accordance with a further aspect of the present invention, a control system may be provided which measures the false indication rate from one threshold circuit, compares this false indication rate to a selected standard rate, and uses the results of the comparison to adjust another threshold circuit at an optimum value.

In accordance with yet another aspect of the present invention, signals applied to an adjustable threshold circuit may be selectively modified by attenuation means such that, once a selected high false indication rate is established by adjustment of the threshold level, the level of the signals applied to the threshold circuit is modified to provide a desired high detection probability although the threshold level itself remains constant.

A better understanding of the invention may be had by reference to the following description taken in conjunction with the accompanying drawings, in which.

Figure 1:
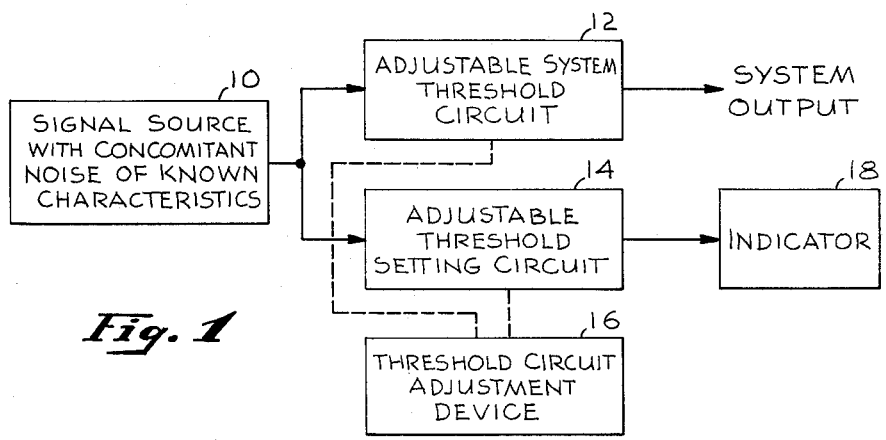
FIG. 1 is a block diagram of a threshold system for practicing the invention.

A threshold system in accordance with the present invention, as shown in FIG. 1, is intended to provide a system output indication whenever signals from a source 10 exceed a selected voltage level. The signal source 10 includes a source which in general terms may be a signal generating device, such as a signal correlator system, a position indicating device, or an analog sensing circuit. For most types of signal sources an analysis of the characteristics of spurious signals such as noise will be available, and statistical data will establish the probability for given threshold levels of false indications resulting from the noise which is concomitant with legitimate useful signals. In the absence of such pre-existing information, conventional analysis techniques may be used to determine the characteristics of the noise.

The signals provided from the signal source 10 are applied to the signal inputs of an adjustable system threshold circuit 12 and an adjustable threshold setting circuit 14. Each of these threshold circuits 12 and 14 has a control input terminal, though the operation of which the detection level established by the circuit may be adjusted. Although the adjustment may be effected electronically or mechanically, a mechanical coupling has been shown here for purposes of illustration, the desired control being accomplished by a threshold circuit adjustment device 16. Although specific examples are given below of the various elements which may be used, here the threshold circuits 12 and 14 may principally consist of electronic amplifying devices, such as tubes or transistors, which are biased by voltages derived from the movable contact of a potentiometer. The amplifying devices may therefore be maintained cut off at a particular voltage level determined by the potentiometer setting and arranged to conduct and provide an output signal whenever the input signal exceeds the selected bias or threshold level.

Since both the noise and useful signal indications generally appear as transient excursions, the output signals derived from the threshold circuits 12 and 14 may appear as a series of pulses of relatively short duration. Signals from the adjustable threshold setting circuit 14 are applied to an indicator 18 which in the simplest case may be a manually resettable counter. The purpose of the indicator 18 is to provide a measure of the number of false indications occurring during a given interval at the threshold setting of the threshold setting circuit 14.

In the operation of the arrangement of FIG. 1, the threshold circuit adjustment device 16 is operated so that the threshold setting circuit 14 establishes a desired setting on the associated indicator 18. During a selected time interval, output signals from the threshold setting circuit 14 actuate the indicator 18 with both false indications and legitimate signal indications. To achieve the chosen false indication rate, the adjustment device 16 need only lower the threshold setting circuit 14 (if the false indication rate is too low) until the proper level is reached. Although legitimate signal indications are interspersed with the false indications at the proper level, the number of legitimate signals is generally small in comparison to the number of false indications, so that the existence of the legitimate signals has little effect upon the determination of a threshold level at which the chosen false indication rate is established.

The threshold circuit adjustment device 16 is concurrently used to set the adjustable system threshold circuit 12 in a given proportionality to the level to which the threshold setting circuit 14 has been adjusted. This proportionality is such that for the known noise characteristics there is both a high detection probability and a low false indication rate at the threshold established by the system threshold circuit 12. Therefore, the output signals from the system threshold circuit 12 accurately represent legitimate signals with a minimum occurrence of spurious false signal indications.

Figure 2:
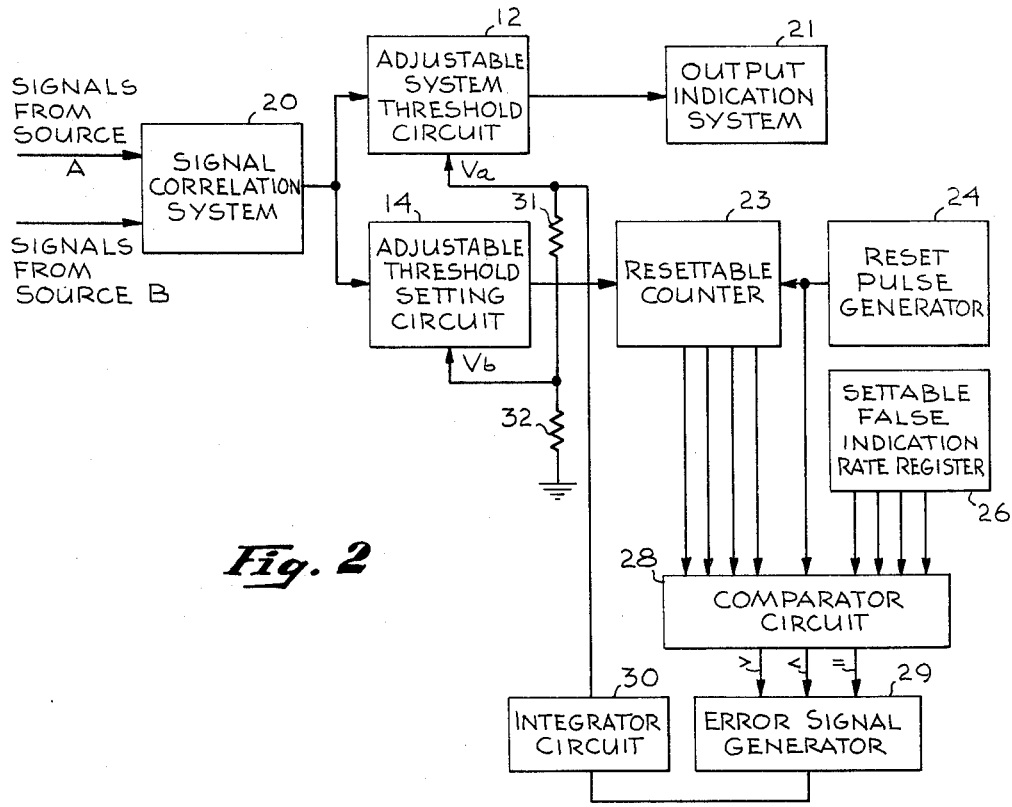
FIG. 2 is a block diagram of an automatic digitally controlled threshold system in accordance with the invention.

Referring now to FIG. 2, a system in accordance with the invention is shown in which a desired threshold level is continuously and automatically established. The system of FIG. 2 derives signals from a signal correlation system 20 which may comprise a portion of a position location system. Signals from two sources, A and B, which have mutually coherent signal components are applied to the signal correlation system 20. The signal correlation system 20 and the threshold system are to operate so as to provide a signal indication whenever the timing displacement between the mutually coherent signal components falls within a selected range of values, as evidenced by a signal in excess of the threshold setting of the system threshold circuit 12.

Correlation output signals from the signal correlation system 20 are applied concurrently to an adjustable system threshold circuit 12 and an adjustable threshold setting circuit 14, which may be constructed as described above in conjunction with FIG. 1. Output signals from the system threshold circuit 12 actuate an output indication system 21. Output signals from the threshold setting circuit 14, however, are fed to an automatic control circuit which governs the adjustment of both the system threshold circuit 12 and the threshold setting circuit 14. Here the noise components of the signals applied to the threshold system may include noise generated within the signal correlation system 20 as well as external noise.

The automatic control circuit includes a resettable counter 23 having a count input terminal which is coupled to the setting circuit 14 and a reset input terminal which is coupled to a reset pulse generator 24. The resettable counter 23 includes a number of output terminals, on which appear signals having values which represent the number registered by the resettable counter 23. The reset pulse generator 24 operates in a timed cycle to provide reset pulses at selected periodic intervals, thus defining a sampling interval for the automatic control system. The interval which is selected may be varied in accordance with the characteristics of the noise and the threshold setting. It will be recognized that any of a number of different types of pulse generators, including recirculating delay line circuits, frequency divider circuits and other cyclically operating devices may be employed for the reset pulse generator 24.

A selected count is presented by a settable false indication rate register 26 having a number of output terminals on which appear digital valued signals which together represent the selected count. The output terminals of both the resettable counter 23 and the settable false indication rate register 26 are coupled to the input terminals of a comparator circuit 28, which may consist of gating circuits intercoupled so as to make a logical decision as to the relative magnitudes of the counts presented by the counter 23 and the register 26. Thus the comparator circuit 28 may have three output terminals, on which appear signals indicating that one count is greater than, less than or equal to the other. With the arrangement shown, the comparator circuit 28 receives continuously varying counts from the resettable counter 23, and also is coupled to receive a sampling pulse from the reset pulse generator 24 at the approximate time at which the counter 23 is reset. The output signal from the comparator circuit 28 is then held until the next sampling pulse is provided, at which time it is changed in accordance with the comparison then existing. To this end, the comparator circuit 28 may include a number of bistable elements (not shown) which are gated by the sampling pulse into states which represent the equality indication provided by the comparator circuit 28 at the sampling time.

Signals for adjusting the threshold level of the threshold circuits 12 and 14 are derived by an error signal generator 29 and an integrator circuit 30. The error signal generator 29 generates a signal of one polarity when one count is greater than the other, as indicated by the comparator circuit 28, and generates a signal of the opposite polarity when the converse is true. No error signal is generated when the counts are equal. The integrator circuit 30 provides a continuing average of these error signals, thus providing a bias signal of changing level to the control inputs of the system threshold circuit 12 and the threshold setting circuit 14. A selected proportionality determined from the known noise characteristics is established between the bias voltage, $V_a$, applied to the system threshold circuit 12, and the bias voltage $V_b$, applied to the threshold setting circuit 14, by means of a voltage divider network consisting of a pair of series resistors 31 and 32 having values in a predetermined ratio.

In the operation of the arrangement of FIG. 2, a particular value for the number of false indications from the threshold setting circuit 14, occurring in the interval between pulses from the reset pulse generator 24, is selected in setting the false indication rate register 26. This number is established with relation to the characteristics of the received signal from the signal correlation system 20 and is set to establish a rate of false indications at the output of the threshold setting circuit 14 which is high enough for the effect of legitimate signal indications also present at this point to be negligible.

As the system operates, therefore, the bias level $V_b$ appearing at the control input of the threshold setting circuit 14 determines the number of pulses applied to the resettable counter 23 during a sampling interval, and thus the total count presented thereby at the termination of a sampling period. Assuming by way of example that the initial bias level $V_b$ of the threshold setting circuit 14 is too high, which means that the threshold level of the system threshold circuit 12 is also too high, relatively few signal indications will be counted by the resettable counter 23 during the sampling interval. As a result, the comparator circuit 28 provides a signal on its "less than" output lead which causes the error signal generator 29 and integrator circuit 30 to decrease the bias voltages $V_a$ and $V_b$. It should be clear that this is done by stages on a substantially continuous basis as the false indication rate for the setting circuit 14 is repeatedly sampled in successive time intervals determined by the reset pulse generator 24 and compared with the output of the false indication rate register 26.

When the respective bias voltages $V_a$ and $V_b$ reach their proper values so that the corresponding thresholds of the circuits 12 and 14 are at appropriate levels as determined by the setting of the false indication rate register 26 and the ratio of proportionality of the resistors 31 and 32, a match occurs in the comparator circuit 28 between the outputs of the resettable counter 23 and the register 26. As a result the "equal to" lead at the output of the comparator circuit 28 is energized, thus causing the error signal generator 29 and integrator circuit 30 to maintain the established bias voltage levels. Similarly, when the threshold levels of the circuits 12 and 14 are too low, so that the count of false indications from the circuit 14 as presented by the resettable counter 23 exceeds the setting of the register 26, the comparator circuit 28 energizes its "greater than" lead. This causes the error signal generator 29 and the integrator circuit 30 to increase the bias voltages $V_a$ and $V_b$ until substantial equality is reached between the actual false indication rate and the setting of the false indication rate register 26. At such time, the threshold level of the system threshold circuit 12 is precisely set to provide high detection probability with a minimum false indication rate.

The arrangement of the invention has particular accuracy because the use of a high false indication rate in the sampling procedure makes the unwanted effects of legitimate indications negligible. The system also operates at high speed, because the effective statistical sample is based upon the great number of false indications available in the noise, and not upon the legitimate indications which are of infrequent occurrence by comparison. Furthermore, the operation of the threshold setting circuit 14 and the automatic control circuit is continuous, but does not interfere with obtaining a low false indication rate for the system itself. Note that changes in the average noise level automatically cause changes in the threshold level.

The invention is not confined to the use of the particular digital indication system which is shown. A number of alternative digital techniques will suggest themselves to those skilled in the art, such as the employment of a subtraction circuit in place of the comparator circuit 28. Such a subtraction circuit may provide a digital indication of the magnitude as well as the sense of the difference between the counter 23 and the register 26, and this magnitude may be converted to an appropriate signal by a digital to analog converter. This is one additional example merely of the alternative techniques and circuits which may be employed. Other arrangements within the scope of the invention will occur to those skilled in the art.

Figure 3:
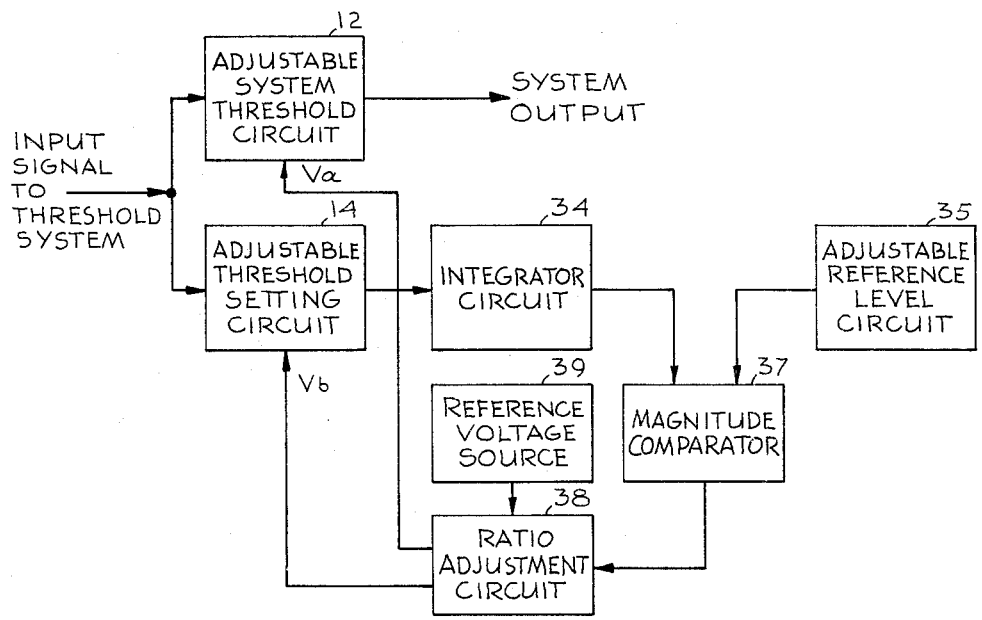
FIG. 3 is a block diagram of an automatically controlled analog system in accordance with the invention.

Referring now to FIG. 3, there is shown a system employing analog circuitry for effecting automatic control of a threshold level. A system threshold circuit 12 and a threshold setting circuit 14 are each coupled to receive the input signal to the threshold system. Output signals from the threshold setting circuit 14 in the form of voltage spikes, or pulses, are applied to an integrator circuit 34, having a selected time constant, which charges to maintain a level determined by the rate of false indications provided by the threshold setting circuit 14 in response to the input signal. The level of the output from the integrator circuit 34 is compared in a magnitude comparator 37 with a reference level provided from a reference level circuit 35. The magnitude comparator 37 may consist of any analog subtraction circuit, known in the art, and provides an error signal to a ratio adjustment circuit 38 which is coupled to the control inputs of the system threshold circuit 12 and the threshold setting circuit 14. The ratio adjustment circuit 38 may be a linear or nonlinear voltage dividing network for dividing the bias levels $V_a$ and $V_b$ in a proportion determined by the characteristics of the noise concomitant with the input signal. A reference voltage source 39 coupled to the ratio adjustment circuit 38 determines the range of the absolute magnitudes of the bias levels $V_a$ and $V_b$.

The operation of the arrangement of FIG. 3 is again continuous and automatic, with the bias levels $V_a$ and $V_b$ being adjusted with a selected proportionality with respect to a standard which is ultimately determined by the setting of the adjustable reference level circuit 35. In any event, the threshold setting circuit 14 provides a high false indication rate, making the effects of legitimate signal indications upon the sampling procedure negligible. Again, although the very high false indication rate of the threshold setting circuit 14 is continually utilized in setting the respective threshold levels, the actual system threshold level advantageously provides a low false indication rate and a high detection probability.

Figure 4:
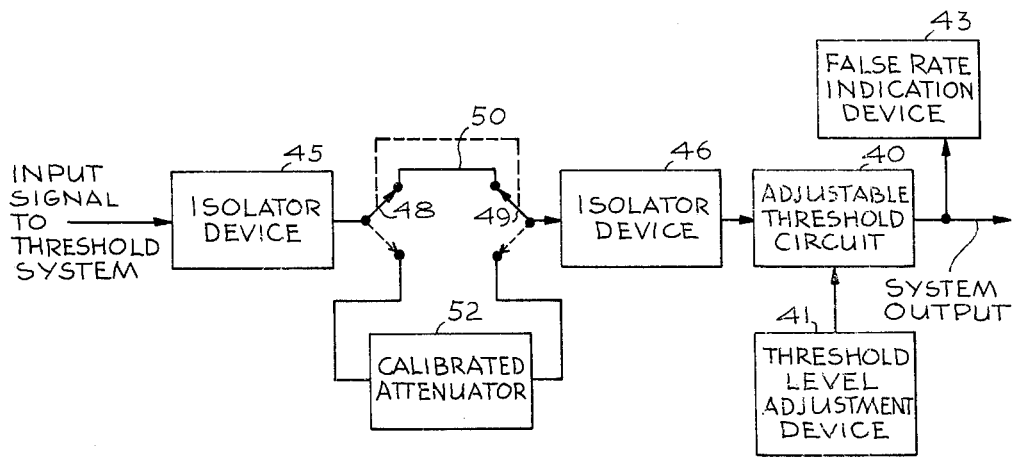
FIG. 4 is a block diagram of a threshold system in accordance with the invention utilizing a single threshold circuit.

In another specific embodiment of the invention, represented in FIG. 4 to which reference is now made, a single adjustable threshold circuit 40 is employed. For purposes of simplicity, an automatic control system is not shown in this arrangement, but instead a threshold level adjustment device 41 may be adjusted to establish the threshold of the adjustable threshold circuit 40 in accordance with indications provided on a false rate indication device 43 to which system output signals derived from the adjustable threshold circuit 40 are applied.

Input signals to the threshold system of FIG. 4 are provided through an isolator device 45, which may advantageously comprise a cathode follower stage, to a selective coupling arrangement providing alternative current paths, thence through a second similar isolator device 46 to the adjustable threshold circuit 40. In the selective coupling arrangement, a pair of single-pole double-throw switches 48 and 49, mechanically coupled so as to be operable together, provide a current path through either a direct conductor 50 or a calibrated attenuator 52. In a first position, both the single-pole double-throw switches 48 and 49 complete the circuit path through the direct conductor 50, while in a second position, shown in phantom, the circuit path is completed through the calibrated attenuator 52.

With this arrangement, the adjustable threshold circuit 40 is set initially to secure a desired high false indication rate by placing the switches 48 and 49 in the first position so that the full amplitude of the input signals is provided through the direct conductor 50 and the isolator devices 45 and 46 to the adjustable threshold circuit 40. With the switches 48, 49 in the first position the adjustment device 41 may be operated until a desired false indication rate is indicated on the indication device 43. Thereafter, the calibrated attenuator 52 may be switched into the signal path by shifting the switches 48, 49 to the second position, while the threshold level previously established by the adjustable threshold circuit 40 is kept substantially constant. The calibrated attenuator 52 effectively reduces the amplitude of both the legitimate signal and false indications which are applied to the adjustable threshold circuit 40 with equal attenuation so that the threshold level is effectively increased by a predetermined amount (relative to both the signal and the noise) to provide a high detection probability with a low false indication rate at the system output. The isolator devices 45, 46 are useful in providing accurate system operation by eliminating impedance mismatches and other effects which are likely to create inequalities when the switches 48, 49 are changed in position. Alternatively, the separate signal paths of FIG. 4 may include different amounts of gain instead of attenuation by providing, for example, a calibrated amplifier in place of the attenuator 52 and operating the switches 48 and 49 in reverse order.

Figure 5:
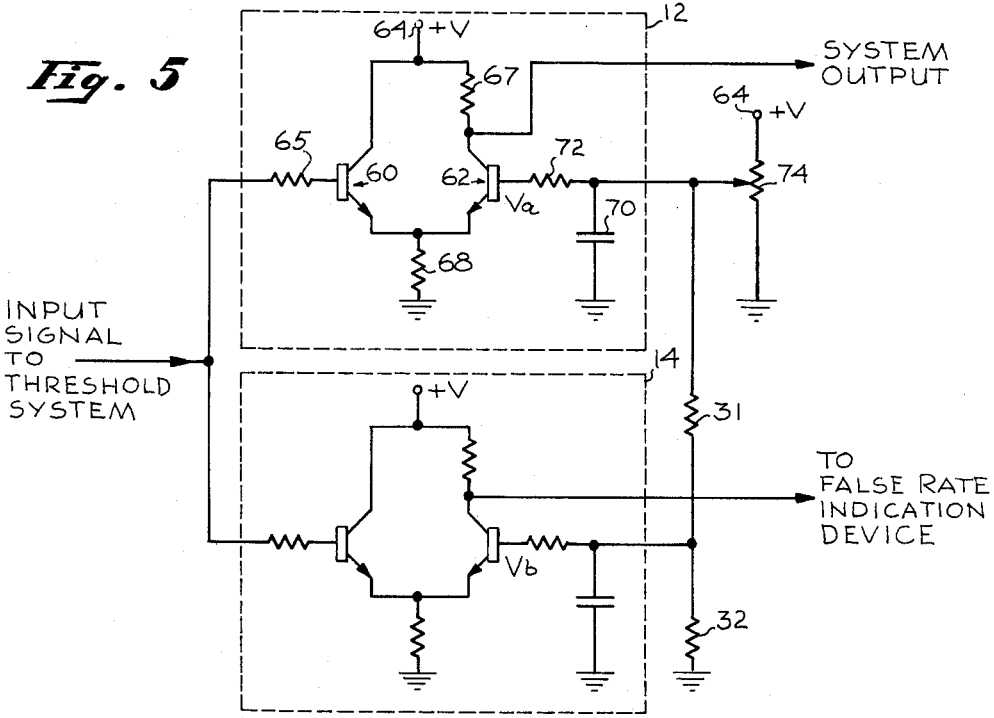
FIG. 5 is a schematic circuit diagram of one arrangement of the threshold circuits which may be utilized in practicing the present invention.

A schematic diagram of specific circuits which may be employed in the adjustable system threshold circuit 12 and the threshold setting circuit 14 is shown in FIG. 5. Inasmuch as the threshold circuits 12 and 14 are essentially similar in this arrangement, only one need be described in detail and it will be understood that the same arrangement and mode of operation exist for the other as well.

The system threshold circuit 12 is a transistor circuit arranged as a differential amplifier and employs a pair of transistors 60, 62 of the N-P-N conductivity type whose collectors are coupled to a positive voltage supply 64. A first transistor 60 may be termed an input transistor and is coupled to receive input signals provided for the threshold system through a current limiting resistor 65. The second transistor 62 may be termed an output transistor, inasmuch as its collector is coupled to the positive voltage source 64 through a load resistor 67, and is also coupled to the output terminal on which the system output signals appear. The emitters of the transistors 60, 62 are coupled together and through a bias resistor 68 which is coupled to a common conductor, here shown as a ground connection. The bias level for this system threshold circuit 12 is again the bias voltage $V_a$, and provides a forward bias at the base of the second transistor 62. The bias control circuit includes an integrating capacitor 70 and resistor 72 arrangement which is coupled to the movable contact of a variable potentiometer 74. The terminals of the potentiometer 74 are coupled to the positive voltage supply 64 and to ground, respectively. In effect, the voltage level derived at the movable contact establishes a threshold adjustment signal for both the system threshold circuit 12 and the threshold setting circuit 14. Voltage divider resistors 31 and 32, disposed and numbered as described in conjunction with the arrangement of FIG. 2 establish the desired proportionality between the bias levels $V_a$ and $V_b$ at the input circuits of the two threshold circuits 12 and 14.

In operation, the arrangement of FIG. 5 functions as an overdriven differential amplifier, with the voltage at the collector of the second transistor 62 serving as the system output signal. For a differential amplifier of this type, the system output voltage is proportional to the difference between the voltage level at the base of the first transistor 60 and the bias level $V_a$ at the base of the second transistor 62. The forward bias level $V_a$ holds the second transistor 62 normally conducting, thus maintaining the output voltage at a relatively constant level. When an input signal in excess of a certain magnitude (the threshold level $V_a$ at the base of transistor 62) is applied to the transistor 60, the latter conducts heavily and cuts off the transistor 62 by means of the coupling afforded by the ccommon emitter resistor 68. As a result the collector transistor 62 is driven positive and this signal is passed to the system output lead. As has been discussed hereinabove, when the threshold level of the system threshold circuit 12 is properly set in accordance with the invention, the output signals from the threshold circuit 12 correspond to legitimate signal indications, thus providing a high detection probability with a minimum of false indications.

The operation of the system threshold circuit 12 and the adjustment of the potentiometer 74 are, of course, made in accordance with false indication rate readings taken from the output signals derived from the threshold setting circuit 14 as discussed above, for example, in connection with FIG. 1. The lower bias level $V_b$ applied within the threshold setting circuit 14 precisely establishes depending upon the ratio of the values of the resistors 31 and 32, the bias level $V_a$ of the system threshold circuit 12.

Figure 6:
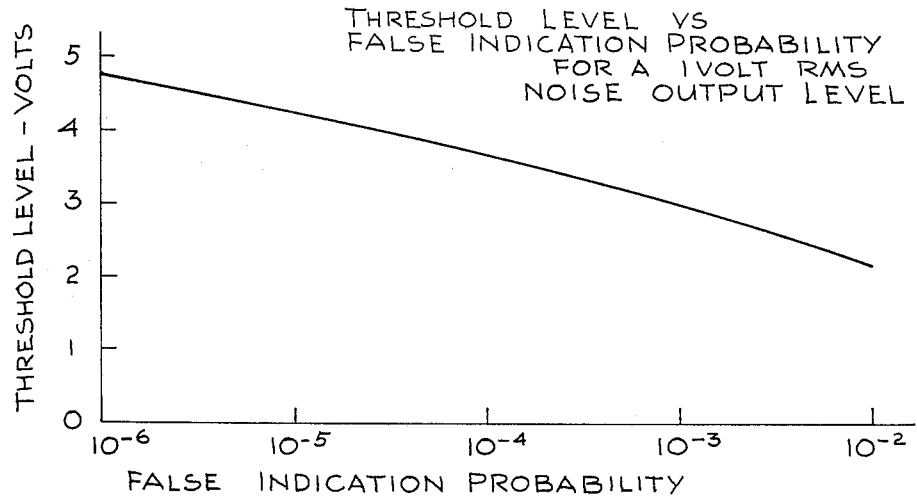
FIG. 6 is a graphical illustration showing the relationship between the false indication probability and the threshold level for a particular spurious noise signal.

A better understanding of the manner in which knowledge of noise characteristics may be utilized to set a threshold level in accordance with a false indication rate may be gained by reference to FIG. 6. FIG. 6 is a diagram of threshold level in volts versus false indication probability plotted on a logarithmic scale for a noise signal of the type encountered in the correlation system referred to above in conjunction with FIG. 2. The curve shonw is provided for a 1-volt R.M.S. noise output level, and demonstrates a substantially exponential decrease in the false indication probability for an increase in the threshold level. Depending upon system requirements, and the extent to which false indications can be tolerated and high detection probability is required, selection of a given false indication rate establishes the threshold level which is required.

While there have been described above and illustrated in the drawings various forms of threshold systems and circuits in accordance with the invention, it will be appreciated that various modifications and alternatives are feasible. Accordingly, the invention should be considered to include all variations and alternative forms falling within the scope of the appended claims.

I claim:

1. An electrical circuit for identifying the occurrence of legitimate signals occurring with concomitant noise of known characteristics and for automatically operating to provide a high detection probability and a low false indication rate, the circuit including the combination of first and second adjustable threshold circuits coupled to receive the desired signals and concomitant noise and to provide output signal indications, a resettable counter coupled to the second adjustable threshold circuit for counting output signal indications provided thereby, means coupled to the resettable counter for resetting the counter at intervals, a settable register for presenting a count indicative of a selected false indication rate, a comparator circuit coupled to the resettable counter and the settable register for providing signals indicative of the relative magnitudes of the counts presented by the resettable counter and settable register, and means coupled between the comparator circuit and the adjustable threshold circuits for setting the threshold levels provided by the threshold circuits in a proportionality determined by the characteristics of the noise, such that the second threshold circuit provides output signal indications with a high false indication rate and the first threshold circuit provides output signal indications with a high detection probability and low false indication rate.

2. A threshold circuit including the combination of a pair of transistor differential amplifiers, each differential amplifier including an input transistor and an output transistor having their emitters coupled together, the base electrode of each input transistor serving as a signal input terminal and the base electrode of each output transistor serving as a control electrode, an output circuit coupled to the collector of the output transistor of a first of the differential amplifiers, a false indication rate circuit coupled to the collector of the output transistor of the second of the differential amplifiers, an adjustable voltage reference device, and a voltage dividing network coupled to the adjustable voltage reference device and coupled to the control electrode of each of the differential amplifiers for providing control biases thereto in a selected proportionality.

References Cited by the Examiner
UNITED STATES PATENTS

| | | | |
|---|---|---|---|
| 2,752,589 | 6/56 | De Long | 340—253 |
| 2,779,869 | 1/67 | Gerks | 324—77 X |
| 2,875,403 | 2/59 | Gilbert | 324—77 |
| 2,962,625 | 11/60 | Berwin et al. | 324—77 X |
| 2,963,653 | 12/60 | Campbell | 328—165 |

ARTHUR GAUSS, *Primary Examiner.*

HERMAN KARL SAALBACH, JOHN W. HUCKERT,
*Examiners.*